July 1, 1924.

B. M. W. HANSON

CHUCK

Filed Aug. 20, 1921    2 Sheets-Sheet 1

1,499,772

Inventor
Bengt M. W. Hanson

By H. Hart
His Attorney

July 1, 1924.  
B. M. W. HANSON  
CHUCK  
Filed Aug. 20, 1921

Inventor  
Bengt M W Hanson  
By  
His Attorney

Patented July 1, 1924.

1,499,772

UNITED STATES PATENT OFFICE.

BENGT M. W. HANSON, OF HARTFORD, CONNECTICUT.

CHUCK.

Application filed August 20, 1921. Serial No. 493,829.

*To all whom it may concern:*

Be it known that I, BENGT M. W. HANSON, a citizen of the United States, and a resident of Hartford, county of Hartford, State of Connecticut, have invented certain new and useful Improvements in Chucks, of which the following is a specification.

The object of the present invention is to improve the construction of chucks of the type having jaws movable towards a common center to grip the work or piece to be held.

In chucks of this type, when the chuck is rotated at a high speed, the tendency is for the jaws to fly apart owing to centrifugal action. This centrifugal force makes it very difficult to move the jaws inwardly to grip the work during rotation of the chuck. The aim of the present invention is to provide an arrangement wherein the centrifugal force of the jaws is counteracted or overcome so that they may be more readily brought into gripping engagement with the piece to be held during the rotation of the chuck.

Other objects and advantages of my improved chuck will appear from the following specification.

Figure 1:
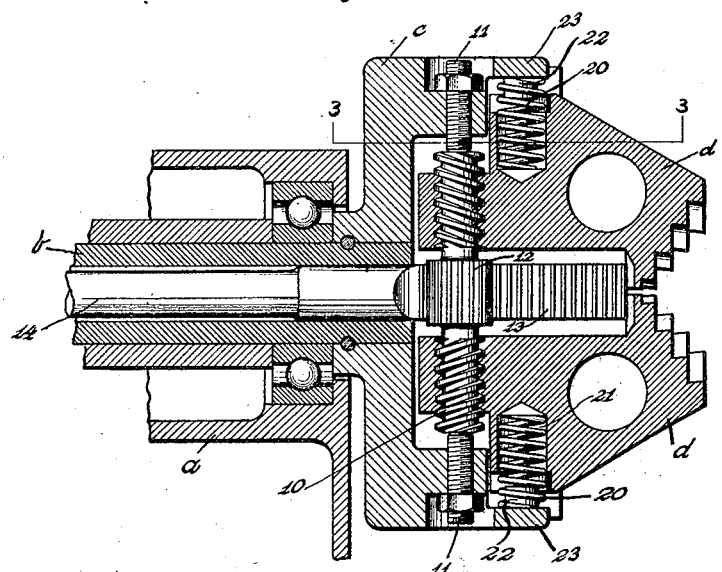
Fig. 1 is a central longitudinal view through a chuck constructed in accordance with one embodiment of my invention.

Referring to the drawings in detail, $a$ denotes a suitable bearing carrying a spindle $b$ having at its forward end a head $c$ in which is slidably mounted a pair of jaw blocks $d$. The jaw faces of these blocks are stepped as shown to accommodate pieces of work of different sizes.

The numeral 10 designates a screw having left and right handed thread portions in threaded engagement with the respective blocks $d$ so that when this screw is rotated the blocks are moved to and from each other to respectively chuck and unchuck the work depending on the direction in which the screw is rotated. The screw is rotatably supported at its ends by bearing members 11 which are preferably in the form of screws to permit of such adjustment of the jaw blocks as to bring them concentric with the axis of the spindle $b$. For the purpose of rotating the screw 10, it is provided with a pinion 12 with which meshes a rack 13 on a bar 14 extending through and slidably mounted in the spindle $b$. This bar carries at its outer end suitable means (not shown) for reciprocating it.

In the absence of means for counteracting or overcoming the centrifugal force of the jaws, when the spindle is rotated at a high speed, it is very difficult, and requires a great amount of force, to move the bar 14 in a direction to bring the jaw blocks towards each other. By the present invention, I provide means for counteracting or overcoming this centrifugal force of the jaw blocks, thereby providing a structure wherein no excessive force is required to move the jaws inwardly to chuck the piece to be held.

Figure 2:
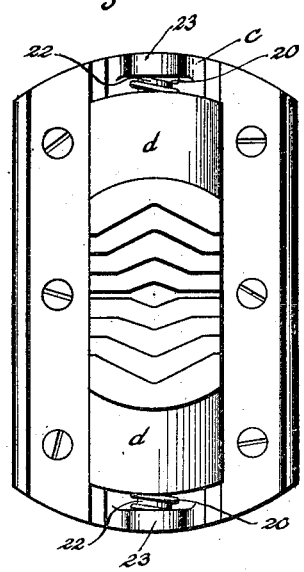
Fig. 2 is a front view of the chuck shown in Fig. 1.
Figure 3:
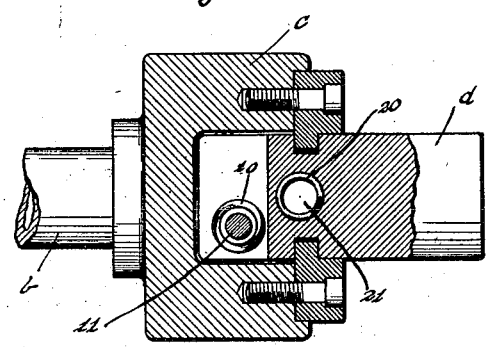
Fig. 3 is a sectional view taken on line 3—3 of Fig. 1.

In the embodiment shown in Figs. 1 to 3, the means for counteracting the centrifugal force of the jaw blocks comprises springs 20 interposed between the head $c$ and the jaw blocks in such a manner as to normally urge the latter inwardly towards the axis of the spindle. In the present illustrative disclosure, the inner ends of these springs are positioned in recesses 21 in the jaw blocks, and the outer ends of the springs are centered by studs 22 positioned on the overhanging ears 23 integral with the head $c$.

Figure 4:
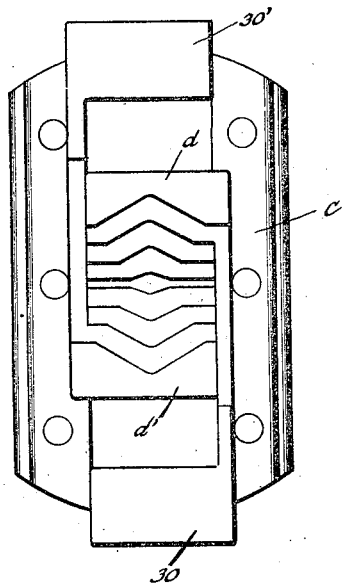
Fig. 4 is a view similar to Fig. 2, but shows another embodiment of the invention.
Figure 5:
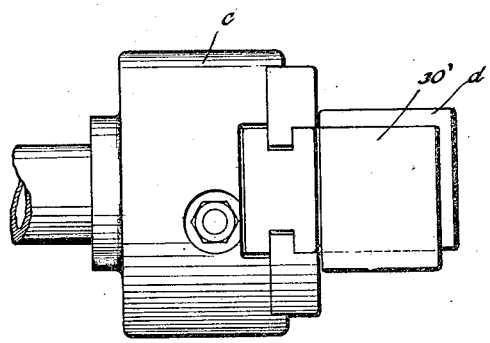
Fig. 5 is a top view of what is shown in Fig. 4.

In the embodiment shown in Figs. 4 and 5, the jaw $d$ is provided with a weight 30, and the other jaw $d'$ with a weight 30'. It will be noted that each jaw and the respective weight connected thereto are positioned on opposite sides of the axis of the chuck; thus, when the chuck is rotating, the centrifugal force of the weights neutralizes or counteracts the tendency of the jaws, under centrifugal force, to fly and remain apart.

It is of course obvious that my invention is susceptible of various modifications and changes which are within the spirit of the invention without departing from the scope of the following claims, it being understood that the present disclosure of my invention is by way of illustration only and it is not to be taken as restrictive of my conception.

I claim as my invention:—

1. In a device of the character described, radially movable jaws, means for positively and bodily moving said jaws towards each other, and automatically operating means for counteracting the centrifugal force of said jaws.

2. In a device of the character described, jaws mounted for movement towards the axis of rotation, means for positively moving said jaws towards and away from the center of rotation of said device during rotation thereof, and resilient means for counteracting the centrifugal force of said jaws.

3. In a device of the character described, a rotatable head, jaws mounted thereon, means for positively moving said jaws towards and away from the center of rotation of said device during rotation thereof and springs between said head and jaws normally urging the latter toward each other, said springs acting in the same direction as said means when the latter is operated to move said jaws towards the center of rotation of said device.

BENGT M. W. HANSON.